United States Patent [19]

Isshiki et al.

[11] 4,364,023

[45] Dec. 14, 1982

[54] OPTICAL CHARACTER READING SYSTEM

[75] Inventors: Isao Isshiki; Koji Sato; Katsuyoshi Sunago; Akihiro Ohoka; Masayuki Akatsuka, all of Osaka, Japan

[73] Assignee: Sumitomo Electric Industries, Ltd., Osaka, Japan

[21] Appl. No.: 156,517

[22] Filed: Jun. 5, 1980

[51] Int. Cl.³ .............................................. G06K 9/00
[52] U.S. Cl. ................... 340/146.3 H; 340/146.3 MA
[58] Field of Search ................. 340/146.3 H, 146.3 J, 340/146.3 AC, 146.3 AH, 146.3 SY

[56] References Cited

U.S. PATENT DOCUMENTS

| | | | |
|---|---|---|---|
| 3,531,770 | 9/1970 | Mauch et al. | 340/146.3 J |
| 3,613,081 | 10/1971 | Morimoto | 340/146.3 H |
| 3,651,461 | 3/1972 | Holt | 340/146.3 AC |
| 3,786,416 | 1/1974 | Bhimani | 340/146.3 AC |
| 3,921,136 | 11/1975 | Bar-Lev | 340/146.3 AH |
| 3,970,991 | 7/1976 | Kawada et al. | 340/146.3 AC |
| 4,104,616 | 8/1978 | Isshiki et al. | 340/146.3 J |
| 4,180,800 | 12/1979 | Isshiki et al. | 340/146.3 SY |

Primary Examiner—Leo H. Boudreau
Attorney, Agent, or Firm—Sughrue, Mion, Zinn, Macpeak & Seas

[57] ABSTRACT

An optical character reading system in which a sheet upon which characters or symbols are printed is illuminated and the characters scanned with a two-dimensional photoelectric sensor. Output signals from the sensors are processed to read the characters through right and left frame detecting circuits. The right and left frame detecting circuits detect white/black patterns of frames formed on the sensor when the left and right sides of the characters extend beyond the ends of the ranges of the sensor. A circuit combines the white/black patterns detected by the right and left frame detecting circuits to provide a recognition of the characters being scanned.

8 Claims, 26 Drawing Figures

|   | R B (⊒) | C (∃) |
|---|---|---|
| A (⊑) | 5 | 9 |
| B (⊐) | ? | 3 |
| C (∃) | ? | 3 |

OPTICAL CHARACTER READING SYSTEM

BACKGROUND OF THE INVENTION

The present invention relates to an optical character reading system for reading characters, symbols and the like which are larger than the size of a sensor used in the character reading system.

Figure 1:
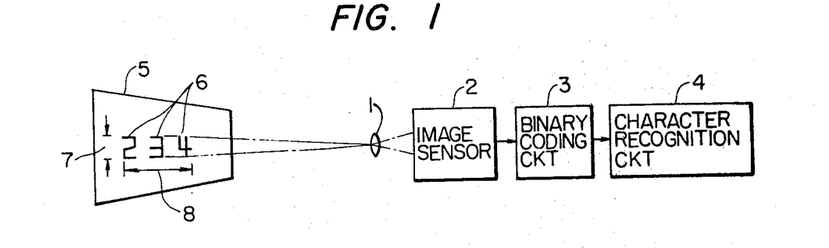
FIG. 1 is an explanatory diagram showing a conventional optical character reading device.

A conventional optical character reading device is shown in FIG. 1. In the conventional device, the image of a character, symbol or the like (hereinafter referred to merely as "a character") 6 on a sheet 5 is formed on an image sensor 2, which is composed of photoelectric conversion elements, through an optical system 1. An analog signal produced by the sensor is converted into a binary signal having states corresponding to the white background of the sheet and the black character by a binary coding circuit 3. The binary signal is coupled to the input of a recognition circuit 4 which recognizes the various characters and produces digital output signals in accordance therewith. In this case, the image sensor 2 is electrically scanned in a vertical direction. If the image sensor 2 is a two-dimensional sensor, the sensor may be electrically scanned in the horizontal direction 8 while the optical system or the sheet is mechanically moved so as to read the characters. If the image sensor 2 is a one-dimensional sensor, then the optical system or the sheet should be mechanically moved to read the characters. The sheet 5 is irradiated by a light source, not shown.

As is clear from the above description, in order to cover a character two-dimensionally with a one-dimensional sensor, it is necessary that the image sensor 2 be moved in the horizontal direction 8 at constant speed relative to the sheet 5. In the case where the speed of the image sensor 2 relative to the sheet 5 is unknown, it is required that the white/black character pattern be stored for the entire character region. Accordingly, the storage capacity of the device must be relatively large resulting in a high manufacturing cost of the device.

Figure 2A:
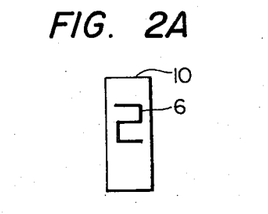
FIGS. 2A and 2B are explanatory diagrams for a description of the relation between the range of a sensor and a character.
Figure 2B:
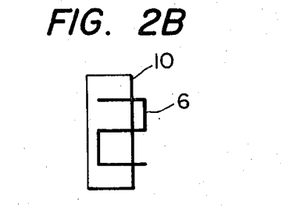

Even for a two-dimensional sensor, if the speed of the image sensor relative to the sheet 5 is unknown or changed, the sensor 2 is not applicable to the case where the size of the character to be read out is larger than that of the sensor 2, for example, as shown in FIG. 2B. In this case, it is necessary either that the sensor 2 be moved at a constant speed with respect to the sheet similar to the case of a one-dimensional sensor or that the white/black patterns are stored over the entire character region. In the latter case, a memory having a large storage capacity is required.

The use of a two-dimensional sensor for reading characters of large width and requiring a large number of binary bits is disadvantageous in that a two-dimensional sensor sufficiently large in size is expensive and that the time required for the recognition process is correspondingly great.

Because of these disadvantages, heretofore it has proved difficult and uneconomical to read a character larger than the range of the sensor.

The present invention has been conceived with the intent of eliminating the above-described difficulties. An object of the invention is thus to make it simple to read and recognize a character which is larger than the range of the sensor.

SUMMARY OF THE INVENTION

This, as well as other objects of the invention, are met by an optical character reading system in which a sheet on which characters, symbols, or the like are printed or described is illuminated by a beam of light, the characters scanned with a sensor made up of photoelectric conversion elements arranged two-dimensionally and output signals of the sensor are processed to read the characters including right and left frame detecting circuits for detecting outputs of the sensor. The right and left frame detecting circuits include buffer memories provided for the right and left frames. White/black patterns of frames formed on the sensor when the left side of the character, which is larger than the range of the sensor, has reached the left end of the range of the sensor and when the right side of the character has reached the right end of the range of the sensor are detected by the right and left frame detecting circuits. Means is provided for combining the white/black patterns detected by the right and left frame detecting circuits to provide a recognition of the character.

DESCRIPTION OF THE PREFERRED EMBODIMENTS

Figure 3A:
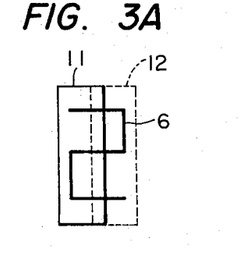
FIGS. 3A–3C are diagrams for a description of the principle of operation of an optical character reading system constructed according to the present invention.
Figure 3B:
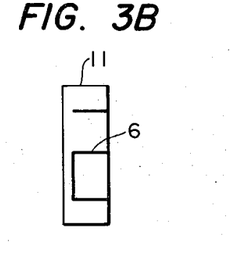
Figure 3C:
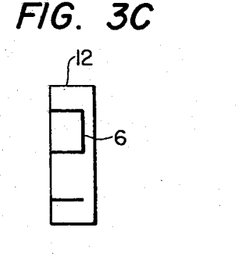

FIG. 3A is a diagram for illustrating a principle of operation of the invention. In accordance with the invention, a first white/black pattern corresponding to the left side of a character 6 sensed from the left end 11 of the range of a sensor and a second white/black pattern corresponding to the right side of the character 6 sensed from the right end 12 of the range of the sensor are both obtained. The character can then be recognized by combining the two white/black patterns. Therefore, even if the horizontal width of the character 6 is larger than the range 11 or 12 of the sensor, the character can be read satisfactorily. Both the left side image shown in FIG. 3B and the right side image shown in FIG. 3C can be accurately obtained independent of the speed of horizontal movement of the sensor.

Figure 4:
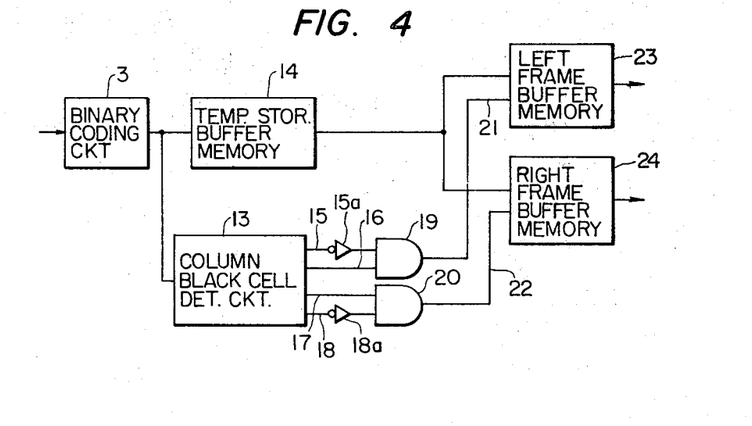
FIG. 4 is a block diagram of a right and left frame detecting circuit constructed according to a preferred embodiment of the invention.

Shown in FIG. 4 is a block diagram of a right and left picture detecting circuit in an optical character reading system constructed according to a first preferred embodiment of the invention. In FIG. 4, reference numeral 3 designates a binary coding circuit which converts to binary form the analog signals produced by a two-dimensional sensor composed of photoelectric conversion elements. Among the two-dimensionally arranged cells of the photoelectric conversion elements, a cell which has detected black will be referred to "a black cell". The output of the binary coding circuit 3 is applied to a column black cell detecting circuit 13 which detects the presence of black cells in each column, that is, in the vertical direction, and to a temporary storing buffer memory 14 which temporarily stores the white/black patterns. The column black cell detecting circuit 13 produces a left end black cell detecting signal on line 15 representative of the presence of black cells in the leftmost column, a left side character element detection signal on line 16 when black cells are continuously present in several lines on the left side except for the leftmost column, a right side character element detection signal on line 17 when black cells are continuously present in several lines on the right side except for the rightmost column, and a right end black cell detection signal on line 18 representative of the presence of black cells in the rightmost column. The term "several lines" is the number of lines of cells which corresponds to the minimum stroke width of a character to be read.

Figure 5:
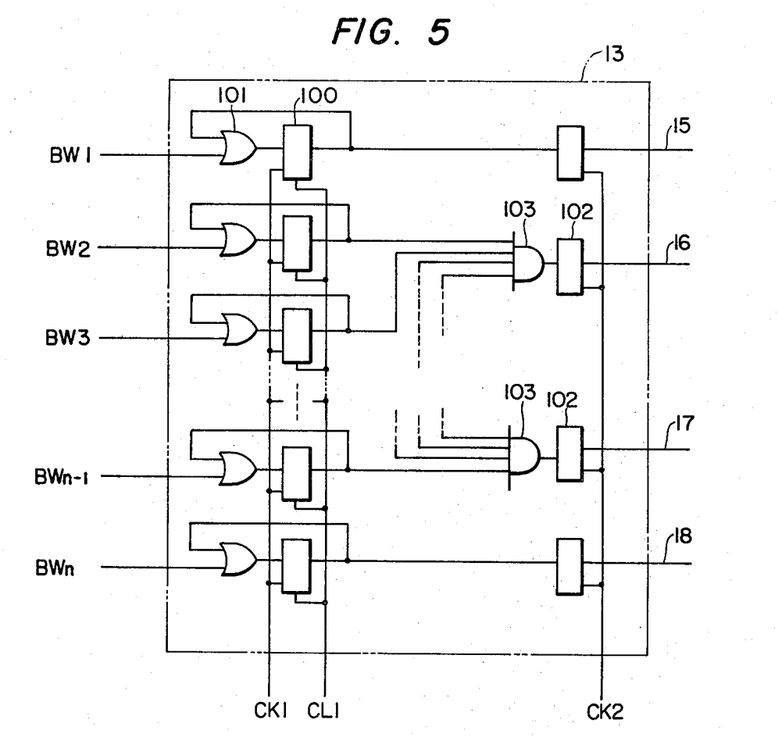
FIG. 5 is a block diagram of a column black cell detecting circuit.

The column black cell detecting circuit 13 is shown in the schematic diagram of FIG. 5 in more detail. The structure and operation of the circuit 13 will be described with reference to the case where binary-coded signals are inputted in a parallel mode for every line. In this case, in addition to binary-coded signals $BW_1$ through $BW_n$ corresponding to the different areas (1 .. . n) along each horizontal columns (1 ... n), a line clock pulse signal $CK_1$ synchronous with the input of binary signals for each horizontal line (1 through m), a frame clock pulse signal $CK_2$ synchronous with the processing of a single frame, and a clear signal $CL_1$ whose timing is slightly later than that of the frame clock pulse $CK_2$ signal are applied to the column black cell detecting circuit 13. For the detection of black cells, a combination of a flip-flop 100 and an OR circuit 101 is provided for each column. The data in the flip-flop 100 is clocked in by pulses of the line clock pulse signal $CK_1$. In FIG. 5, reference numeral 102 designates output flip-flops and reference numeral 103 AND circuits.

Figure 6:
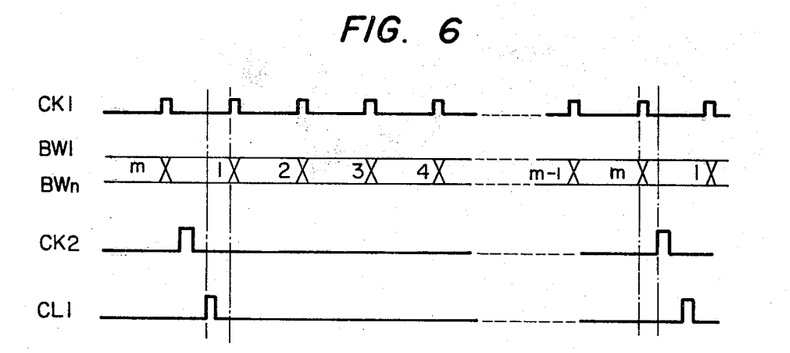
FIG. 6 is a time chart indicating various signals applied to the column black cell detecting circuit.

FIG. 6 is a timing chart showing the time relationships among various signals in FIG. 5. In FIGS. 5 and 6, like reference characters designate like signals.

With respect to the binary-coded signals $BW_1$ through $BW_n$, when the first line data is applied to the OR circuits 101, the first line data is set in the registers 100 with the aid of the line clock pulse signal $CK_1$. Thereafter, up to the m-th line, the data is set in the registers 100 after being subjected to a logical sum operation performed upon the data in the registers 100 and the incoming signals $BW_1$-$BW_n$ by the OR circuits whenever the line clock pulse signal $CK_1$ is applied thereto. Therefore, when a black cell is present in a column, the content of a corresponding register 100 will be a logical "1". For the rightmost and leftmost columns, the contents of the registers 100 are directly transferred to the corresponding output registers 102 thereby setting the left end black cell detection signal on line 15 and the right end black cell detection signal on line 18 in the respective output registers 102. The contents of the registers 100 for several lines on both sides of the sensor range except for the two ends are applied to the respective AND circuits 103. The outputs of the AND circuits 103 are set in the respective output registers 102 by the frame clock pulse signal $CK_2$ as a result of which the left side character element detection signal on line 16 and the right side character element detection signal on line 17 are set in the respective output registers 102. After the frame data has been set in the output registers 102 by the frame clock pulse signal $CK_2$, the registers 100 are cleared by the clear signal $CL_1$.

The binary signals of white/black patterns stored in the temporary storing buffer memory 14 as described above are written in a left frame buffer memory 23 when a left frame detection signal on line 21 is at "1" while the binary signals are written in a right frame buffer memory 24 when a right frame detection signal on line 22 is at "1". In this manner, data of the left frame with the left end of the character being read as a reference and data of the right frame with the right end of the character as a reference is stored in the buffer memories 23 and 24, respectively. The left frame detection signal on line 21 is produced at the output of an AND circuit 19 to inputs of which are applied the left end black cell detection signal on line 15 through an inverter 15a and the left side character element detection signal on line 16. The right frame detection signal on line 22 is produced at the output of an AND circuit 20 to inputs of which are applied the right end black cell detection signal on line 18 through an inverter 18a and the right side character element detection signal on line 17.

The relation between the white/black pattern image on the sensor and the distribution of black cells in the vertical columns is changed as the sensor is moved horizontally as illustrated in the sequence of FIGS. 7A–7D.

In FIGS. 7A–7D, reference characters $x_1$ through $x_4$ indicate white/black patterns, which are determined by the relative positions between the range 10 of the sensor and the character 6 while $y_1$ through $y_4$ indicate the horizontal distribution of black cells along a single horizontal line within the sensor range where the part 25 indicates an area where no black cells are present in the vertical columns and the part 26 where black cells are present.

Figure 7A:
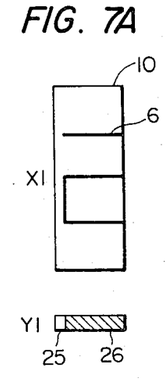
FIGS. 7A–7D are explanatory diagrams for a description of the relation between a white/black pattern and the distribution of black cells.
Figure 7B:
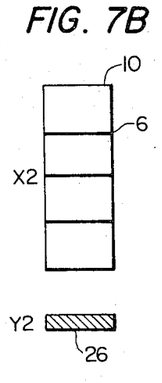

The white/black pattern $x_1$ in FIG. 7A corresponds to the case where the left end black cell detection signal (LBF) on line 15 is at "0" and the left side character element detection signal (LCF) on line 16 is at "1". If the moving speed of sensor is low, then a frame having the same positional relationship can be repeatedly obtained. Therefore, in order that a frame which satisfies the conditions that the LBF is at "0" and the LCF is at "1" as described above be obtained as the left frame of a character, the following process is carried out. In the case where the above conditions are satisfied, a left frame flag (LF) is assumed to be "1" while in all other cases it will be "0". It is assumed that the left frame flag immediately before the left frame flag presently being processed is represented by BLF. Then, only when $\overline{BLF} \cdot LF = 1$, where $\overline{BLF}$ is the complement of BLF, is the white/black pattern at that instant to be taken as a left frame.

Figure 7C:
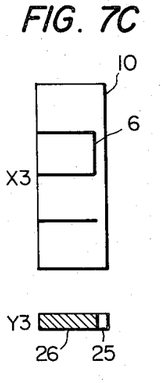
Figure 7D:
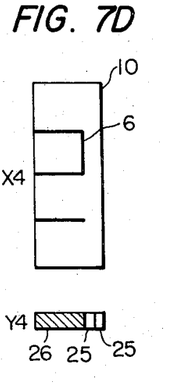

The white/black pattern shown in FIG. 7C relates to the case where the right side character element detection signal RCF on line 17 is at "1" and the right end black cell detection signal RBF is at "0". When these conditions are satisfied, a right frame flag RF is "1" while in all other cases it will be "0". With the right frame flag immediately before the right frame flag being processed represented by BRF, then only when $\overline{BRF} \cdot RF = 1$, where $\overline{BRF}$ is the complement of BRF, is the white/black pattern to be taken as a right frame.

In the manner described above, the data of the white/black pattern $x_1$ in FIG. 7A is stored in the buffer memory 23 while the data of the white/black pattern $x_3$ of FIG. 7C is stored in the buffer memory 24.

According to the present invention, the recognition process is carried out utilizing both the white/black pattern data stored in the left frame buffer memory 23 and the right frame buffer memory 24. For this purpose, a recognition process system is employed in which predetermined characteristics are sensed and extracted in the form of digital signals from the right and left frames and the characteristics thus extracted are combined in order to recognize the character being sensed. Otherwise, a system in which the white/black pattern data of the right and left frames are combined and a composite frame obtained by combining the data of the two frames may be utilized to recognize a character.

Figure 8:
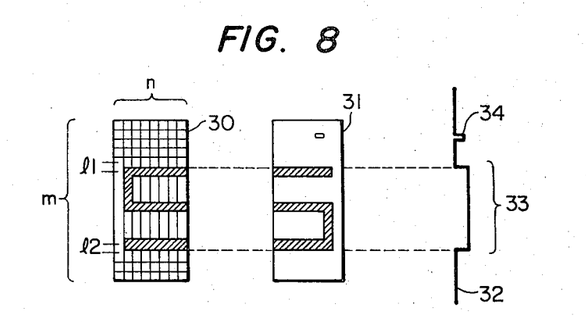
FIG. 8 is a diagram for a description of the principle of operation of a recognition process system in which right and left frame characteristics are extracted.

FIG. 8 is a diagram for a description of the principle of operation of the recognition process system in which characteristics of the right and left frames are extracted to recognize a character. A left frame 30 and a right frame 31 are provided by the right and left frame buffer memories shown in FIG. 4. The binary bits for the cells in the horizontal lines of the white/black pattern data of the right and left frames 31 and 30 are logically summed and the series of sums is formed into a single sum signal. The results of the summing operation are shown at the right of the figure. From the sum signal it may be determined that areas in which the number of lines having black cells is more than a predetermined value are areas containing character information such as indicated by the region 33 of the sum signal while the remaining areas are assumed empty areas such as 32 and 34. By utilizing the sum signal and knowing from the presence therein of "1"'s the vertical extent of the sensed character and desired characteristics of the left or right frame can be extracted.

It is assumed, for example, that a frame is made up of a white/black pattern having an $n \times m$ bit arrangement with n bits in the horizontal direction and m bits in the vertical direction and the region 33 corresponds to positions from $l_1$ to $l_2$ in the vertical direction. In this system, column characteristics from the vertical direction are extracted from the white/black pattern of the two left end columns after which column characteristics of the next two columns shifted one column to the right of the first two columns are extracted. This operation is repeatedly carried out up to the right end column so that $n-1$ column characteristics are extracted.

Figure 9:
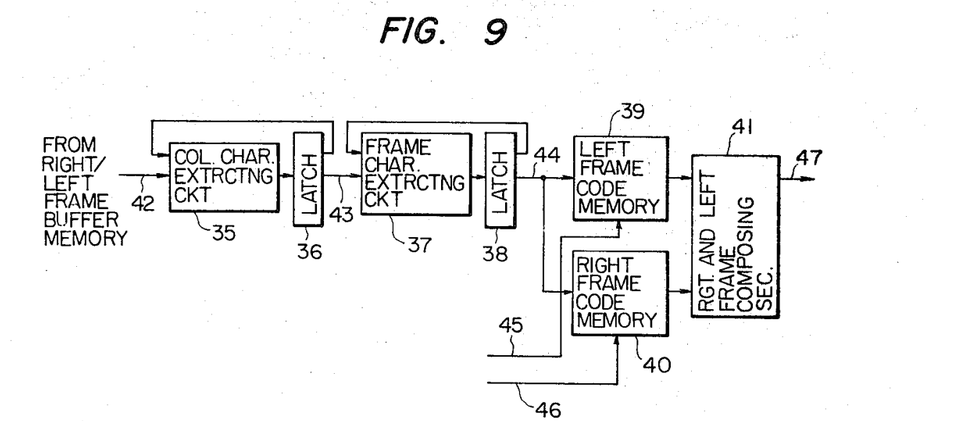
FIG. 9 is a block diagram of a recognition process section according to the recognition process system described with reference to FIG. 8.

FIG. 9 is a block diagram showing a recognition process circuit section which operates according to the recognition process system described with reference to FIG. 8. The recognition process section includes a column characteristics extracting circuit 35 forming a sequence circuit with a latch circuit 36, a frame characteristic extracting section 37 forming a sequence circuit with a latch circuit 38, and a right and left frame composing section 41 having a left frame code memory 39 and a right frame code memory 40 on its input side.

Figure 10:
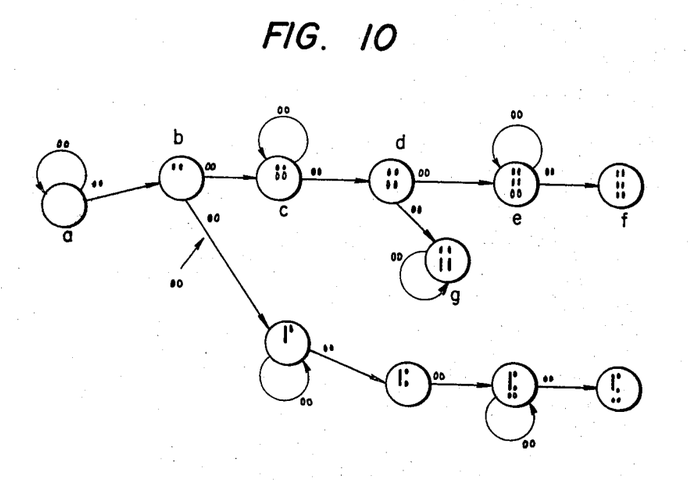
FIG. 10 is a condition transition diagram of column characteristics in the recognition process section in FIG. 9.

White/black pattern data 42 for two columns from the left frame buffer memory or the right frame buffer memory is applied in a 2-bit parallel mode to the column characteristic extracting section 35 m times corresponding to the number of character bits in the vertical direction. The section 35 is thereby accessed by the data 42 and the content of the latch circuit 36 and the resulting output of the section 35 is latched by the latch circuit 36. Accordingly, the content of the latch circuit 36 is changed successively as shown in FIG. 10, which is a condition transition diagram, and conditions corresponding to the 2-bit input in the final stage is applied as a column characteristic code 43 to the frame characteristic extracting section 37. In FIG. 10, when the 2-bit parallel inputs are both "white" at the initial stage a, then the initial condition a is maintained as it is. If the 2-bit parallel inputs are both "black", then the condition a is shifted to a condition b. Thereafter, if the 2-bit parallel inputs are both "white", then the condition b is shifted to a condition c. From condition c, if the 2-bit parallel inputs are both "black", then the condition c is shifted to a condition d. Thereafter, if the 2-bit parallel inputs are both "white", then the condition d is shifted to a condition e. From condition d, if the 2-bit parallel inputs are both "black", then the condition e is shifted to a condition f, and, if the 2-bit parallel inputs are the final two bits in the columns, the condition f is inputted as the column characteristic code 43 into the frame characteristic extracting section 37.

Condition a represents an initial condition. The latch circuit 36 is first set in an initial condition a. When white/black data with respect to cells on the first and second columns in line $L_1$ in 2-bit parallel mode is applied to the ROM 35, the ROM 35 is addressed in response to the white/black data and the data from the latch circuit 36 representing the initial condition a in response to which the content stored at the assigned address of the ROM 35 is read out to the latch circuit and is registered therein. Subsequently, when the white/black data with respect to cells on the first and second columns in the second line $L_2$ is supplied to the ROM 35, the ROM 35 is addressed in response to the second white/black data and the registered condition data in response to which fresh data is produced representing the new condition mode. This operation is repeatedly carried out until the last white/black data with respect to cells on the first and second columns in last line is applied to the ROM 35. Then, the column characteristic extracting operation is repeatedly carried out for pairs of adjacent columns, for example, columns 2 and 3, 3 and 4, . . . (n−1) and n in the same manner. That is, this column characteristic extracting operation is carried out (n−1) times. More specifically, assuming that the first and second columns exhibit column characteristics shown in the above figure, the above described operation is carried out in the following manner.

Figure 17:
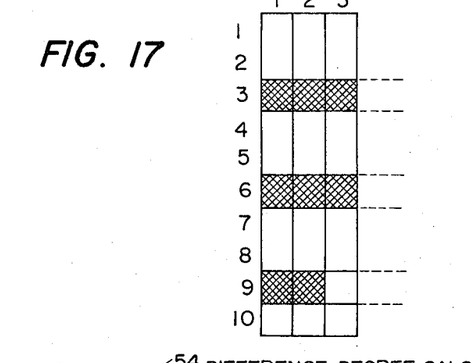
FIG. 17 is an explanatory diagram for explaining a column characteristic extracting operation.
Figure 18:
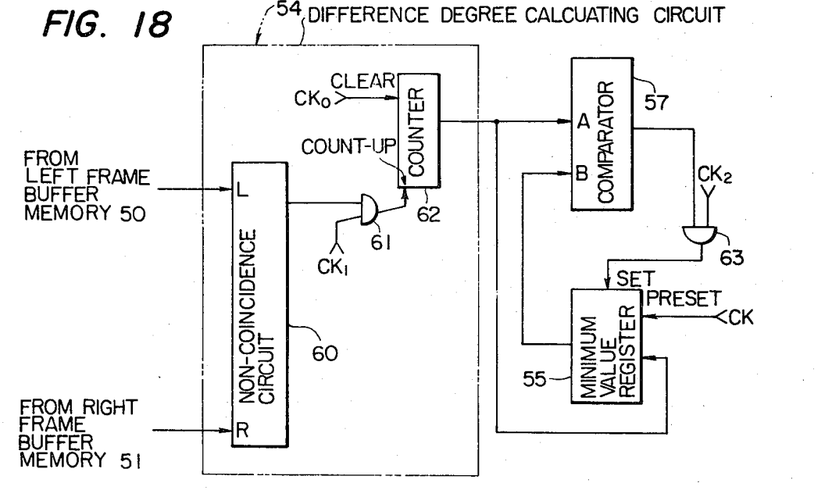
FIG. 18 is a detailed circuit diagram of the difference degree calculating circuit shown in FIG. 13.

Initially, the latch circuit 36 is set to an initial condition a. Please note that the column characteristic extracting operation is controlled by software in accordance with a sequence shown in FIG. 10. Therefore, when the first white/black mode data (□□, white-white) is applied to the ROM 35, the condition data to be registered in the register 36 is not shifted. When the second white/black data white-white (□□) is applied, the condition mode a is also not shifted. Upon the occurrence of the third black-black (■ ■) data, the condition mode a is shifted to that b as shown in FIG. 10. As a result, the condition mode b is registered in the register 36 instead of the previous mode a. Because the fourth data is white-white (□□), according to the sequence of FIG. 10, the condition mode b is shifted to the condition mode c. The fifth data is also white-white (□□) and thus the mode c is not shifted. That is, it is not until an occurrence of black-black (■ ■) data that the mode c is not shifted to the mode d. The sixth data is black-black (■ ■), and thus the mode c is shifted to d. Therefore, since white-white (□□) data successively occurs twice, the mode d is shifted the mode e. Finally, the ninth data is black-black (■ ■) and therefore the mode e is shifted to the mode f. This mode f represents the column characteristic of column 1 as shown in FIG. 17. The modes a through f for example are preset according to the types of characters to be read.

Figure 11:
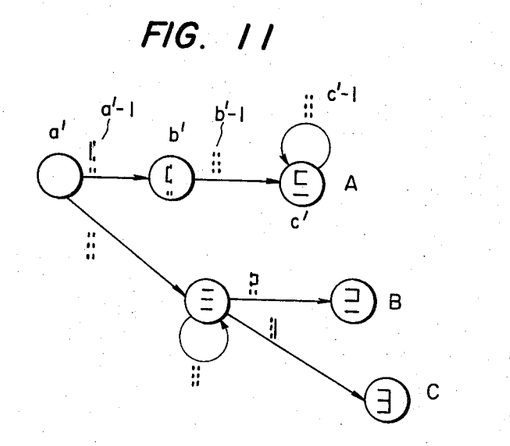
FIG. 11 is a condition transition diagram of frame characteristics in the recognition process section in FIG. 9.

The left or right frame column characteristic code on line 43 from the latch circuit 36 is applied to the frame characteristic extracting section 37 (n−1) times. The section 37 is accessed by the column characteristic code on line 43 from the latch circuit 38 and the output of the section 37 is latched by the latch circuit 38. That is, the ROM is addressed and the data stored in the assigned address read out. Accordingly, the content of the latch circuit 38 is successively changed as indicated in FIG. 11, which is a condition transition diagram. A condition corresponding to the final stage column characteristic code input is applied as a frame characteristic code on line 44 to both the left frame code memory 39 and the right frame code memory 40 under control of signals on lines 45 or 46.

For either the case of extracting the left frame characteristics first or extracting the right frame characteristics first, the timing from the instant that the application of the output of the left frame buffer memory or the right frame buffer memory to the column characteristic extracting section 35 is started until the frame characteristic is obtained by the frame characteristic extraction section 37 is known. Therefore the frame characteristic timing signals on lines 45 and 46 can be applied to the left frame code memory 39 and the right frame code memory 40, respectively, in synchronization with the timing with which the frame characteristics are obtained. That is, a clock pulse synchronous with the shifting of the cells in the vertical direction is applied to the latch circuit 36 and with a clear signal applied thereto in synchronization with the shifting in the horizontal direction. A clock pulse is applied to the latch circuit 38 in synchronization with the horizontal shifting before the clear signal is applied to the column characteristic extracting section 35 so that the latch circuit receives the output of the column characteristic extracting section 35 to conduct the necessary frame processing. Therefore, a clear signal is applied to the latch circuit. Thus, as described above, the signals 45 and 46 are applied to the memories 39 and 40, respectively.

In the FIG. 11 diagram, when an input a′−1 is available in the initial condition a′, then the condition a′ is shifted to a condition b′. Therefore, if an input b′−1 is provided, then the condition b′ is shifted to a condition c′. If inputs provided thereafter are only inputs c′−1 which overlap one another, then the condition c′ is maintained as the final stage and the condition c′ is written as the frame characteristic code on line 44 into the left frame code memory 39 or the right frame code memory 40. It should be noted that the frame characteristic is such that the configuration of a part of or the whole of a character to be read is coded and therefore a plurality of codes are generated for character. The same code may be generated for parts of different characters as the case may be. Thus, the frame characteristic code 44 is extracted in the condition transition indicated by A, B and C in FIG. 11.

Figure 12:
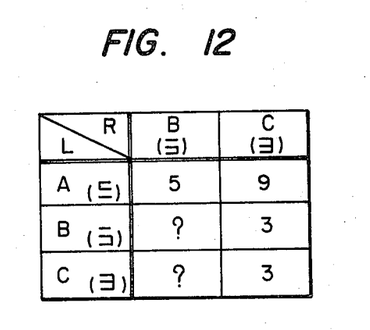
FIG. 12 is a diagram for a description of the character recognition process which is carried out by combining frame characteristics.

In this fashion, characters can be identified by combining the frame characteristic codes as shown in FIG. 12. For instance, if the right frame characteristic code R is B when the left frame characteristic code L is A, then the character can be identified as "5". If the code R is C when the code L is A, then the character can be recognized as "9". If the right frame characteristic code R is C when the left frame characteristic code L is B or C, then the character can be identified as "3". Reference character "R" designates a right frame characteristic code which is obtained by the above mentioned column characteristic modes a to f. Reference character "L" designates a left frame characteristic code which is obtained by the column characteristic mode a to f. This reading system employs a high speed scanner. Thus, during one scanning operation for one character, a plurality of frame characteristic codes are produced. The specific frame characteristic codes are designated by A, B and C, for instance.

The right and left frame composing section 41 operates to combine the characteristics of the right and left frames to carry out character recognition as described with reference to FIG. 12. The section 41 receives as a higher address a frame characteristic code on line 44 applied to the left frame code memory by accessing the code with the aid of the signal on line 45. The section 41 also receives as a lower address a frame characteristic code 44 applied to the right frame code memory by accessing the code with the aid of the signal on line 46. In the section 41, the address data is combined and its recognition result outputted on line 47.

Figure 16:
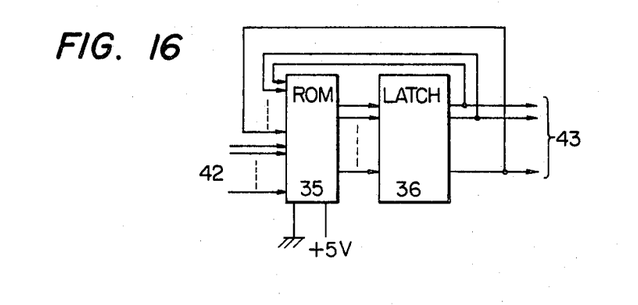
FIG. 16 is a circuit diagram showing one example of a column characteristics extracting circuit and a latch circuit.

The section 35, the column characteristic extracting circuit, is preferably a read only memory (ROM). An Intel Co. type B 2716, or Texas Instruments Co. type 2516 or 2532 may be employed for the ROM. Texas Instruments Co. type 74LS273 may be employed as the latch circuit 36. The ROM 35 is addressed by white/black data 42 for two columns from the left or right frame buffer memory in a 2-bit parallel mode and the output of the latch circuit 36 and then the memory content which is stored at the assigned address of ROM 35 are read out and applied to the frame characteristic extracting circuit 37 through the latch circuit 36. The connections between the section 35 and latch circuit 36 are shown in FIG. 16.

The extracting section 37 is also a ROM. The ROM 37 is addressed by the output from the latch circuit 36 and the output from the latch circuit 38. The memory content which is stored at the assigned address of the ROM 37 is read out and applied to the left or right frame code memory 39 or 40 through the latch 38.

The section 41 is also preferably a ROM. The ROM 41 is addressed by the output from the left or right frame code memory and the memory content stored at the assigned address is read out and applied to the next stage.

In the above description, in order to extract the right and left frame characteristics, the column characteristics are first extracted from two lines in the vertical utilizing the column characteristics thus extracted. However, instead of two lines, three lines or more can be used. Extraction of line characteristics instead of the column characteristics may be carried out using a plurality of lines in the horizontal direction in a circuit similar to that used for the column characteristic extraction with the frame characteristics extracted utilizing the line characteristics thus extracted.

A recognition process system has been described in which, after the frame characteristics have been extracted from the right and left frame white/black patterns, the frame characteristics are combined to recognize the character. However, a recognition process system different from the above-described one may be employed in which the combination of the right and left frame white/black patterns is first carried out to form a single combination frame with the frame characteristics of the combination frame subsequently extracted to recognize the character. An example of the latter type system will be described with reference to FIG. 13.

Figure 13:
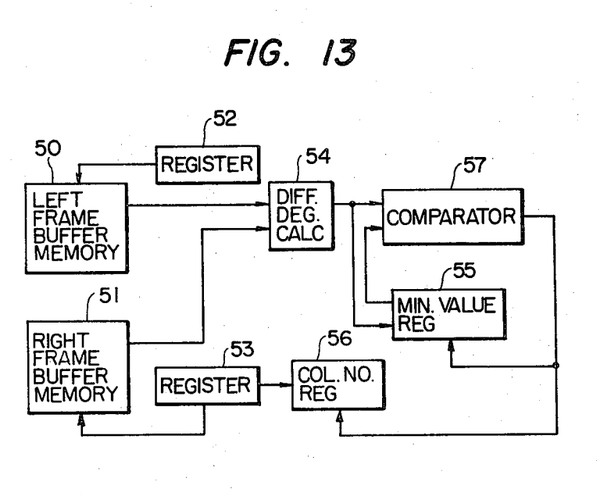
FIG. 13 is a block diagram showing another embodiment of the invention utilizing a recognition process system in which character recognition is carried out by extracting the frame characteristics of a combined frame.

In FIG. 13, reference numeral 50 designates a left frame buffer memory, 51 a right frame buffer memory, 52 and 53 column number register, 54 a difference degree calculating circuit for calculating a difference in bit arrangement in the vertical columns hereinafter referred to as "a difference degree" when applicable, 55 a minimum value register in which a minimum value of difference degree is stored, 56 a column number register for storing a column number producing a minimum value, and 57 a difference degree minimum value comparator circuit.

In the second embodiment of the invention shown in FIG. 13, a complete character pattern is obtained by combining the left picture frame data stored in the buffer memory 50 and the right picture frame data stored in the buffer memory 51. The following description relates to the meaning of the term "difference degree".

The digital white/black bit pattern of the rightmost end column number in the character pattern which is read out of the left frame buffer memory 50 according to the content of the column number register 52 and the digital white/black bit pattern of each column number in the right frame which is read out of the right frame buffer memory 51 according to the content of the column number register 53 are divided into bit groups each having several bits and are compared with each other. The thus obtained digital bit group patterns are compared so as to obtain a coincidence signal or non-coincidence signal in a difference degree calculating circuit 54. As a result, a minimum number of non-coincidence signals represents the fact that the rightmost end column of the left picture frame corresponds to one of the columns of the right picture frame. In this case, the content of the register 53 represents the number of column of the right picture frame which corresponds to the rightmost end column of the left picture frame. According to this result, a combination of character patterns in the left and right picture frame is carried out to achieve a character reading out operation.

The rightmost end column number of the character pattern in the left frame which was stored in the left frame buffer memory 50 is transferred to the column number register 52. Moreover, all of the column numbers in the right frame which were stored in the right frame buffer memory 51 are sequentially stored in the column number register 53.

The bit pattern of the rightmost end column number in the character pattern is read out of the left frame buffer memory 50 according to the content of the column number register 52 while the bit pattern of each column number in the right frame is read according to the content of the column number register 53. The bit patterns thus read are applied to the difference degree calculating circuit 54. When the first difference degree calculation is carried out by the calculating circuit 54, the difference degree is applied through the comparator circuit 57 to the minimum value register 55 where it is stored. As the second, third, fourth, and so on difference degree calculations are carried out by the calculating circuit 54, the difference degrees computed by the calculating circuit 54 are compared with the difference degrees which have been stored in the minimum value register 55 in the comparator circuit 57. When the newly calculated difference degree is smaller than the previously stored value, then the newly calculated difference degree instead of the latter one is stored in the minimum value register 55 and the column number of the smaller difference degree is stored in the register 56.

Thus, the difference degree calculation and comparison with respect to the bit pattern of the rightmost end column number of the right frame are carried out as a result of which the column number of the right frame, which is the minimum difference degree from the bit pattern of the rightmost column number in the left frame, is stored in the column number register 56.

In the case where character recognition is carried out by combining the contents of the buffer memories 50 and 51, the white/black patterns are successively read out of the left frame buffer memory 50 beginning with the first column until the column number coincides with the content of the column number register 52.

After the white/black patterns of the left frame have been read up to that of the column corresponding to the content of the column number register 52, the white/black patterns of the right frame the white/black patterns of up to the column number n are successively read with reference to the content of the column number register 56.

Referring now to FIG. 13 there are shown therein a preferred arrangement of the difference degree calculating circuit 54, the comparator 57, and minimum value register 55. The degree difference calculating circuit 54 includes a non-coincidence circuit 60 to which the outputs of the left and right frame buffer memories 40 and 41 are coupled. When the two inputs to the non-coincidence circuit 60 are unequal, an output signal is produced which is coupled to one input of AND gate 61 the other input to which is coupled the $CK_1$ signal. The output of the AND gate 61 is coupled to the count-up input of a counter 62. Counter 62 is cleared by the $CK_0$ signal. The output of counter 62 is coupled to the "A" input of comparator 57 and to the data input of minimum value register 55. The output of minimum value register 55 is coupled to the "B" input of comparator 57. Comparator 57 produces a logical "1" signal when A<B. This signal is coupled to one input of AND gate 63 to the other input of which is coupled the $CK_2$ signal. The output of AND gate 63 is coupled to the set input of the minimum value register 55. The preset input of the minimum value register 55 is formed by the CK signal.

In operation, a CK pulse is applied to the minimum value register 55 to set the value stored therein at zero before commencing operation of difference degree calculating operation. A $CK_0$ pulse is applied to counter 62 of the difference degree calculating circuit 54 to clear the contents thereof prior to the initiation of scanning of the rows of the right and left left frames. A $CK_1$ pulse is produced in synchronization with the 1-bit scanning operation for each row. After the completion of scanning operations, a $CK_2$ pulse is produced prior to the occurrence of the next $CK_0$ pulse to thereby reset the minimum value register 55 if the output from the counter 62 is less than the value stored in the minimum value register 55.

Figure 14A:
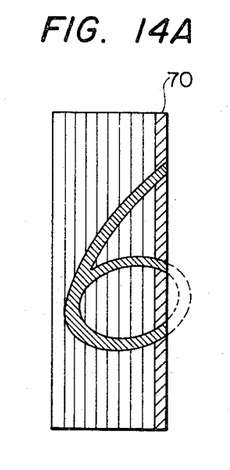
FIGS. 14A, 14B, 15A, and 15B are explanatory diagrams showing different characters which are recognized by combining right and left frames.
Figure 14B:
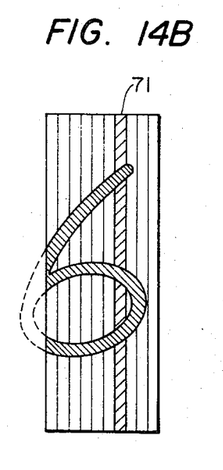

In the case of a character as shown in FIGS. 14A and 14B, the white/black data starting from the left end column and going to the column 70 is read starting in the left frame as in FIG. 14B. Thereafter, as shown in FIG. 14B, the white/black data starting from column 71, which represents the minimum difference degree from the bit pattern of the aforementioned column 70 up to the rightmost column, is read out to thereby recognize the character.

Figure 15A:
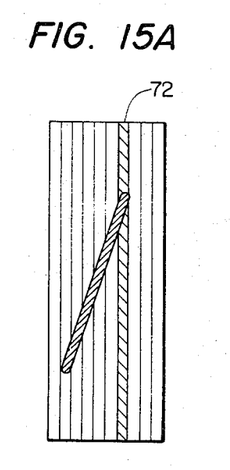
Figure 15B:
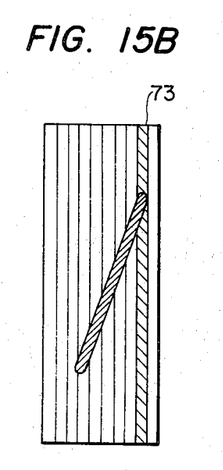

In the case of a character as shown in FIGS. 15A and 15B, the character can fall entirely within each of the right and left frames of FIGS. 15A and 15B respectively. Therefore, the character can be recognized by stacking the column 72 on the column 73. In practice, the pattern is fully equivalent to that of the white/black data of the left frame only.

As is apparent from the above description, with the present invention, the white/black patterns of the frames formed on the sensor when the left edge of a character or symbol which is larger than the range of sensor reaches the left end of the range of the sensor and when the right edge of the character or symbol reaches the right end of the range of the sensor are detected and the white/black patterns thus detected are combined to make it possible to recognize the character or symbol. Thus, a character or symbol larger than the range of the sensor can be positively read.

Furthermore, the optical character reading system according to the invention is advantageous in that, as the sensor employed in the invention is a two-dimensional sensor, the phase difference of a character or symbol can be detected with high accuracy.

What is claimed is:

1. An optical character reading system for reading characters having a character width in a scanning direction, said system comprising:
 a sensor comprising a two-dimensional array of photoelectric conversion elements covering an area having a scanning width in said scanning direction, said sensor generating output signals;
 a left frame detecting circuit comprising a left frame buffer memory for detecting and storing a left two-dimensional pattern of said output signals which occurs when the left side of a character is at the left end of the area covered by said sensor;
 a right frame detecting circuit comprising a right frame buffer memory for detecting and storing a right two-dimensional pattern of said output signals which occurs when the right side of said character is at the right end of said area covered by said sensor; and
 means for combining said left and right two-dimensional patterns to recognize said character.

2. An optical character reading system as claimed in claim 1, wherein the scanning width of said two-dimensional array is less than the width of said characters.

3. An optical character reading system as claimed in claim 1 or 2, wherein said first and second two-dimensional patterns of output signals represent at least partially overlapping portions of said character.

4. The optical character reading system of claim 1 wherein said means for combining comprises a first column number register having inputs coupled to receive outputs of said left frame buffer memory and having outputs coupled to inputs of said left frame buffer memory; a register having inputs coupled to receive outputs of said right frame buffer memory and having outputs coupled to control inputs of said right frame buffer memory; a second column number register having outputs coupled to inputs of said register; a difference degree calculating circuit having inputs coupled to said outputs of said left frame buffer memory and said right frame buffer memory; a comparator circuit having one set of inputs coupled to receive outputs from said difference degree calculating circuit; a minimum value register having inputs coupled to comparison outputs of said comparator and having outputs coupled to a second set of inputs of said comparator, said second column number register having inputs coupled to receive outputs from said comparator.

5. The optical character reading system of claim 4 wherein said difference degree calculating circuit comprises: a non-coincidence determining circuit; an AND gate having one input coupled to receive a comparison output of said non-coincidence circuit and a second input coupled to a clock pulse source; and a count-up counter having a count-up input coupled to an output of said AND gate and a clear input coupled to a second source of clock pulses.

6. An optical character reading system in which a sheet of characters on which characters are described is illuminated, the characters scanned with a sensor comprising photoelectric conversion elements arranged two-dimensionally and output signals from the sensor are processed to read and recognize the characters comprising: a binary coding circuit receiving inputs from said sensor; a temporary storage buffer memory receiving outputs from said binary coding circuit; a column black cell detecting circuit receiving inputs from said binary coding circuit; a left frame buffer memory receiving inputs from said temporary storage buffer memory and said column black cell detecting circuit; a right frame buffer memory receiving inputs from said temporary storage buffer memory and said column black cell detecting circuit; a column characteristic extracting circuit receiving data in serial-parallel fashion from one of said left and right frame memories: a latch having inputs coupled to receive outputs from said column characteristic extracting circuit and outputs of said latch being coupled to second inputs of said column characteristic extracting circuit; a frame characteristic extracting circuit having inputs coupled to receive said outputs from said first latch; a second latch having inputs coupled to receive outputs from said frame characteristic extracting circuit, said latch having outputs coupled to second inputs of said frame characteristic extracting circuit; a left frame code memory and a right frame code memory having inputs coupled to receive outputs from said second latch; a right and left frame composing section receiving inputs from said left and right frame code memories.

7. The optical character reading system of claim 6 wherein said column black cell detecting circuit comprises a set of OR gates each having one input coupled to receive a corresponding output from said binary coding circuit; a set of flip-flops having a data input coupled to an output of a corresponding OR gate, a data output of each of said flip-flops being coupled to a second input of the corresponding OR gate, each of the clock and clear inputs of said flip-flops being coupled to a corresponding clock pulse source; a second set of flip-flops, first and second ones of said second set of flip-flops being coupled to receive outputs from end ones of said first set of flip-flops; a set of AND gates, one of said AND gates being provided for each flip-flop of said second set of flip-flops except for said end ones of said flip-flops, said AND gates having inputs coupled to receive outputs from flip-flops of said first set of flip-flops and outputs of said AND gates being coupled to corresponding ones of flip-flops of said second set of flip-flops.

8. The optical character reading system of claim 6 wherein each of said column characteristic extracting circuit and said frame characteristic extracting circuit comprise a read only memory.

* * * * *